April 22, 1958     F. A. LEWIS ET AL     2,831,563
MACHINE TO PICK UP, ELEVATE, AND DISCHARGE PILED BULK PRODUCE
Filed Sept. 21, 1956     3 Sheets-Sheet 1
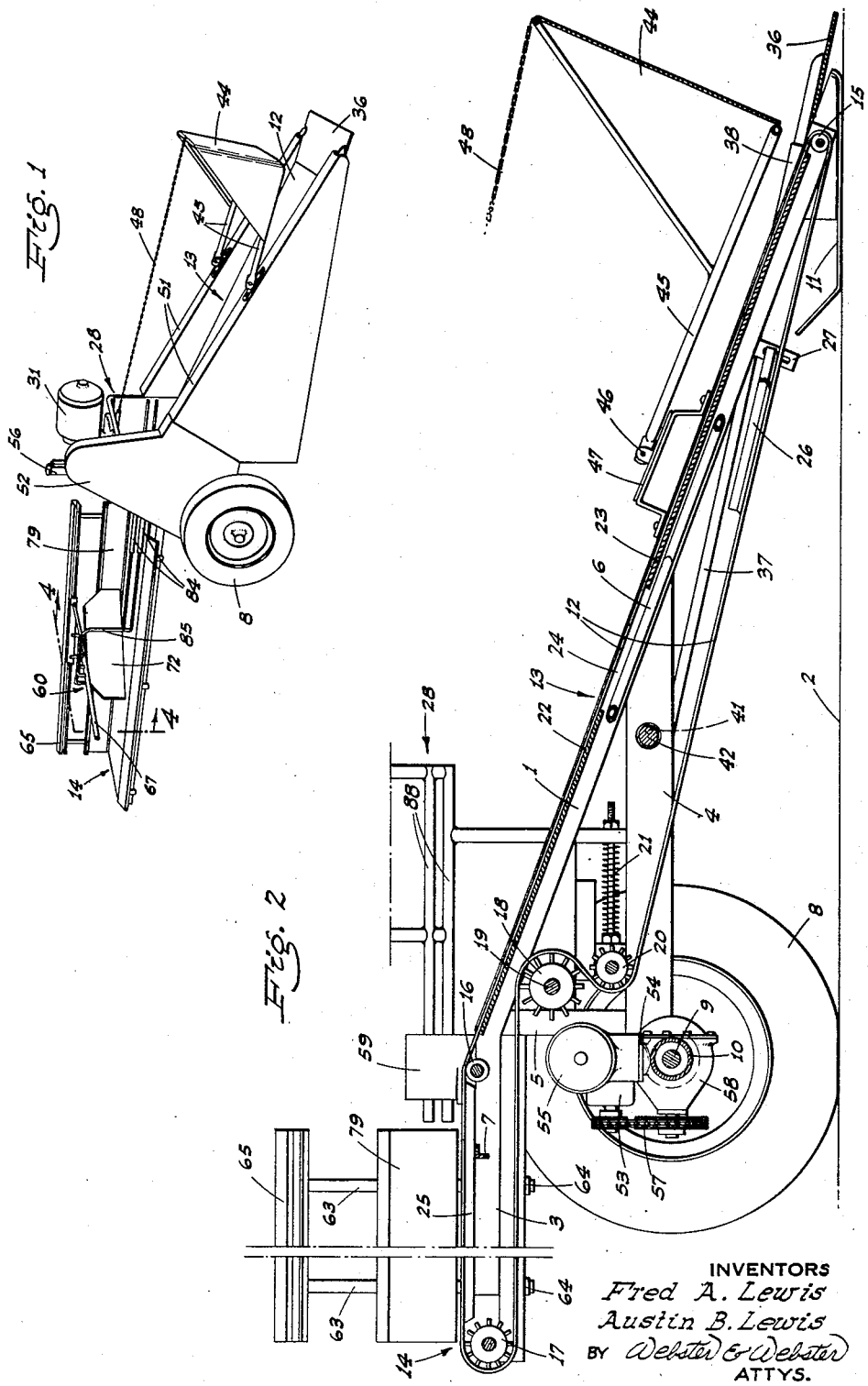
INVENTORS
Fred A. Lewis
Austin B. Lewis
BY Webster & Webster
ATTYS.

April 22, 1958   F. A. LEWIS ET AL   2,831,563
MACHINE TO PICK UP, ELEVATE, AND DISCHARGE PILED BULK PRODUCE
Filed Sept. 21, 1956   3 Sheets-Sheet 2

INVENTORS
Fred A. Lewis
Austin B. Lewis
BY Webster & Webster
ATTYS.

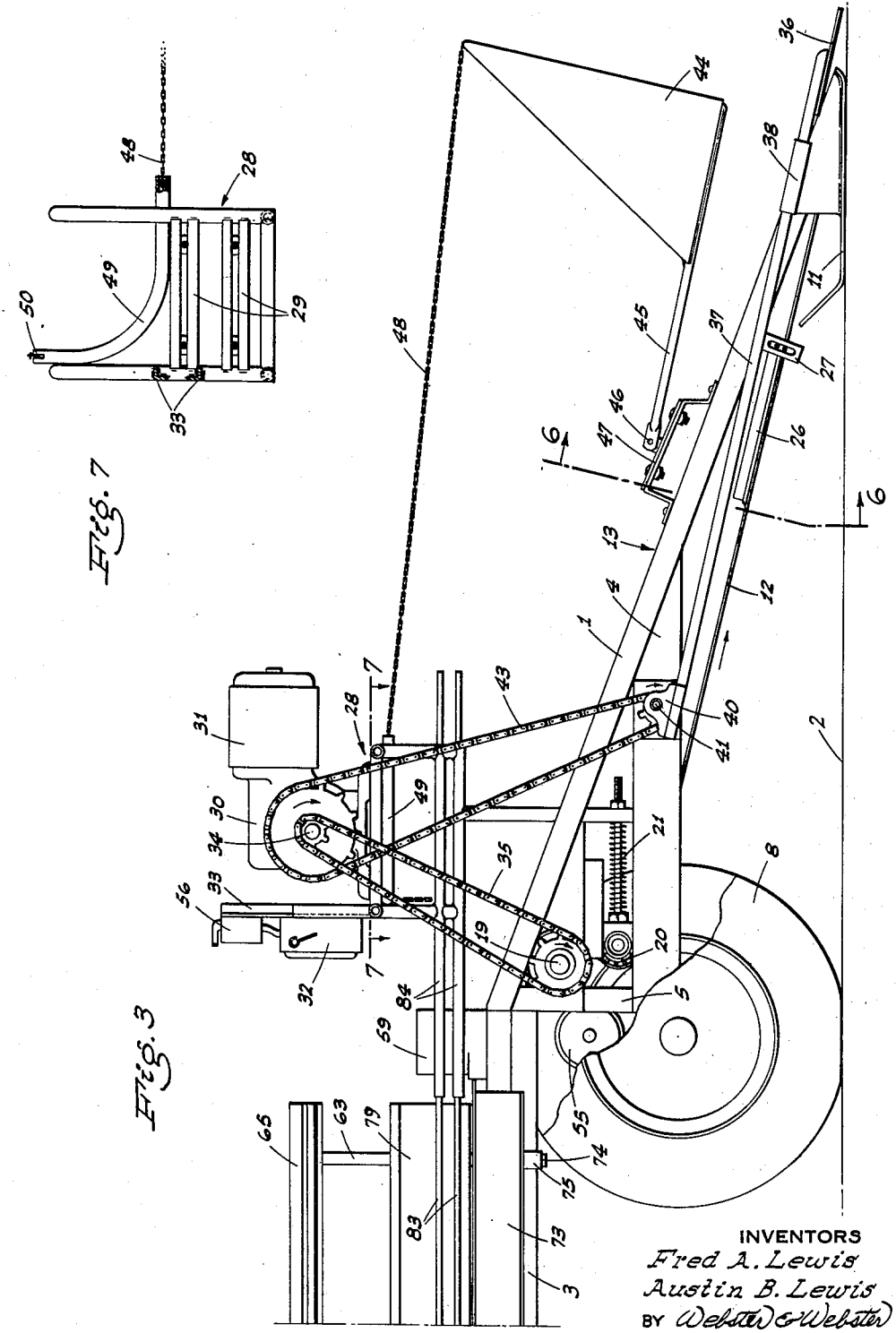

United States Patent Office 2,831,563
Patented Apr. 22, 1958

2,831,563

MACHINE TO PICK UP, ELEVATE, AND DISCHARGE PILED BULK PRODUCE

Fred A. Lewis and Austin B. Lewis, Klamath Falls, Oreg.

Application September 21, 1956, Serial No. 611,138

11 Claims. (Cl. 198—10)

This invention is directed to, and it is a major object to provide, a novel power actuated machine whose purpose is to pick up bulk produce, such as potatoes, from a pile on the floor of a bin or cellar, to then elevate the produce to a given point, and at said point to discharge such produce into an adjacent carry-off conveyor or other receiving equipment. One of the substantial advantages of the machine is that it eliminates the need of costly and time-consuming hand shoveling or forking of the produce from the pile, and also the machine is operative to avoid the bruising, cutting, or spearing of the produce which is commonly attendant manual shovel or fork handling thereof.

Another important object of this invention is to provide a machine to pick up, elevate, and discharge piled bulk produce, which has a relatively great capacity and wherein the flow of the produce from the pile into the machine is assured by a novel oscillating pick-up plate, but which flow is controlled—as to quantity—by an adjustable flow regulating gate disposed in adjacent cooperative relation to such oscillating pick-up plate.

An additional object of the invention is to provide a machine to pick up, elevate, and discharge piled bulk produce, which embodies—with an endless driven conveyor functioning to elevate the produce from the pick-up plate—a novel sweep or diverting unit which cooperates with the conveyor at a point elevated relative to, but remote from, said pick-up plate; such sweep or diverting unit being operative to cause the produce to gravity-discharge laterally from the conveyor into an adjacent, portable, carry-off conveyor or the like.

A further object of the invention is to provide a machine, as in the preceding paragraph, which is mobile and arranged to advance into the pile of produce for continuous pick-up thereof; said sweep or diverting unit being mounted for relatively longitudinal movement on the machine, and being connected to the adjacent carry-off conveyor or the like in a manner to remain in a fixed position relative thereto as the machine so advances. This eliminates the necessity of too frequent re-positioning of said carry-off conveyor.

It is also an object of the invention to provide a machine, of the type described, which is designed for ease and economy of manufacture and operation; the machine including a minimum of parts requiring servicing, maintenance, or replacement after long use.

Still another object of the invention is to provide a practical, reliable, and durable machine, of the type described, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the machine.

Fig. 2 is an enlarged longitudinal sectional elevation thereof, with the rearward section of the conveyor and related parts foreshortened. In addition, the protective shrouds are omitted.

Fig. 3 is an enlarged fragmentary side elevation of the machine with the shrouds removed and with the near wheel partly broken away.

Fig. 7 is a fragmentary sectional plan view taken on line 7—7 of Fig. 3.

Figure 4:
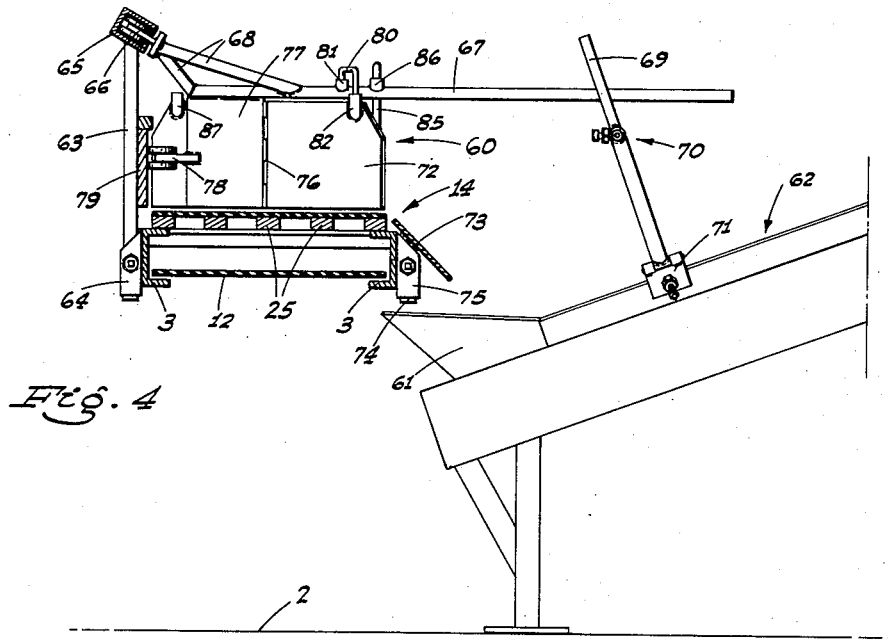
Fig. 4 is a transverse sectional elevation taken on line 4—4 of Fig. 1, but showing in addition the carry-off conveyor into which the produce is discharged from the machine.
Figure 5:
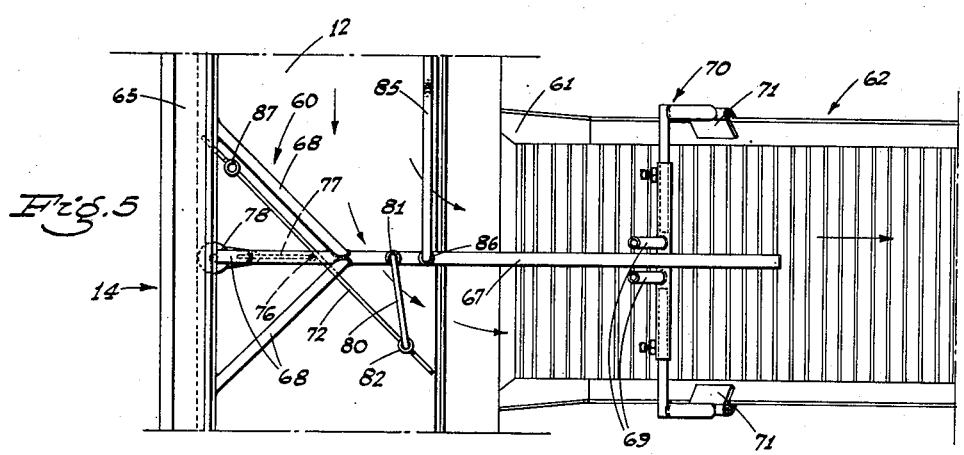
Fig. 5 is a fragmentary plan view of the portion of the machine shown in Fig. 4; i. e., the sweep or diverting unit in association with the adjacent carry-off conveyor.
Figure 6:
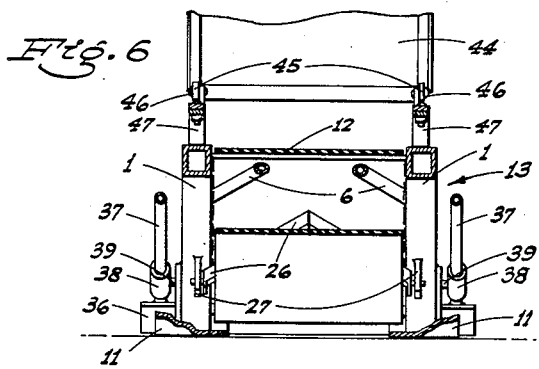
Fig. 6 is a transverse sectional elevation taken on line 6—6 of Fig. 3.

Referring now more particularly to the drawings, and to the characters of reference marked thereon, the machine comprises—to form a main frame—a pair of transversely spaced, relatively long, longitudinal front beams 1 which extend at a gradual upward and rearward incline from a point adjacent but short of the floor 2 to merge at their upper ends with corresponding transversely spaced, longitudinal rear beams 3 which extend rearwardly a substantial distance; such rear beams being of laterally inwardly facing channel configuration in cross section.

Transversely spaced, horizontal sub-beams 4 are fixed, at their forward ends, to the front beams 1 intermediate the ends of the latter, and thence project rearwardly; the rear ends of the front beams 1 and sub-beams 4 being fixedly connected by posts 5.

The above described elements of the main frame are suitably connected, transversely of the machine, by cross members, shown—for example—at 6 and 7.

The main frame is supported, intermediate its ends, by transversely spaced wheels 8 carried on an axle 9 within a housing 10; such axle being driven in the manner hereinafter described, for the purpose of advancing the machine or reversing the same.

At their forward ends the front beams 1 are each rigidly fitted with a floor engaging skid 11; the wheels 8 and skids 11 thus serving to maintain the machine in a fixed position above the floor, but for movement therealong.

An endless, non-foraminous conveyor belt 12 extends the full length of the described main frame, and defines—in its upper run—an upwardly and rearwardly inclined forward section, indicated generally at 13, and a horizontal rearward section, indicated generally at 14. More specifically, the endless conveyor belt 12 turns about a transverse idler roller 15 which spans between the forward ends of the longitudinal beams, thence extends upwardly and rearwardly at an incline and rides over another transverse idler roller 16 spanning between the forward end portions of the rear beams 3.

From the idler roller 16 the endless conveyor belt 12 runs to and turns about a ribbed transverse idler roller 17 which spans between the rear ends of said beams 3; such belt then running forwardly and turning over a transverse, ribbed drive roller 18 carried on a cross shaft 19 journaled in the main frame. From the drive roller 18 the endless conveyor belt 12 returns to the idler roller 15, but adjacent said drive roller the belt is engaged by the ribbed roller 20 of a belt tightener 21.

The portion of the upper run of the endless conveyor belt which defines the forward section 13 is supported from beneath by plates 22 and 23 secured to and extending between the beams 1; there being an opening between adjacent ends of said plates, as at 24, for the purpose of permitting dirt to escape.

The portion of the upper run of the endless conveyor belt 12 which defines the rearward section 14 is supported from below by transversely spaced, longitudinal slats 25 suitably mounted in connection with the rear beams 3.

To clean the endless conveyor belt 12 on its innermost face a scraper 26 rides the same between the rollers 15 and 20; such scraper being attached to ears 27 fixed to, and depending from, the front beams 1.

The endless conveyor—i. e. the belt 12—is driven, with the upper run moving rearwardly, as follows:

A skeleton frame, indicated generally at 28, is mounted in connection with—and upstands from—the main frame above, and in clearance relation to, the rear portion of the forward section 13 of said conveyor; such skeleton frame 28 including a platform 29 on which a reduction gear box 30 is mounted, and which gear box is driven by a unitary electric motor 31 controlled by a master switch 32 mounted on a post structure 33 which upstands from the skeleton frame 28.

The output shaft 34 of the reduction gear box 30 drives the cross shaft 19 through the medium of an endless chain and sprocket unit 35 which completes the drive from the motor 31 to the endless conveyor belt 12 through said cross shaft 19 and drive roller 18.

When the machine is in operation the endless conveyor belt 12 is constantly driven by means of the foregoing mechanism.

Immediately ahead of the forward ends of the front beams 1 there is a full-width, forwardly and downwardly inclined oscillating pick-up plate 36 whose forward edge is immediately adjacent the floor 2 and whose rearward edge is immediately adjacent the upper portion of the turn of the conveyor belt 12 about idler roller 15. The oscillating pick-up plate 36 is fixed to the forward ends of a pair of transversely spaced, longitudinally extending rods 37 which lie outside the front beams 1, and which rods are carried adjacent but short of said plate 36 in guide sleeves 38, pivoted—as at 39—for rocking motion.

The rear ends of the rods 37 are fitted with eccentric blocks 40 journaled on eccentric or crank pins 41 on a cross shaft 42 supported, in journaled relation, by the sub-beams 4. The cross shaft 42 is driven from the output shaft 34 of the reduction gear box 30 by an endless chain and sprocket unit 43.

Consequently, as long as the endless conveyor belt 12 is driven and in operation, the cross shaft 42 is likewise driven, causing a relatively fast but short stroke oscillation of the pick-up plate 36, and which oscillation is caused by the crank pins 41, eccentric blocks 40, and rods 37.

With slow advance of the machine into a pile of produce—such as potatoes—on the floor 2 (which advance is caused by the hereinafter described drive of the wheels 8), the oscillating pick-up plate 36 gradually works under the pile immediately adjacent the floor; the oscillating action causing the produce to feed easily over said plate 36 and onto the lower and front end of the forward section 13 of the endless conveyor.

In order to regulate the quantity of flow of the produce from the oscillating pick-up plate 36 onto the conveyor, as above, an upstanding, forwardly facing, metering gate 44 is disposed in adjacent but adjustably vertically spaced relation above the idler roller 15; such metering gate 44 being mounted on, and projecting upwardly from, the forward portions of a pair of transversely spaced, longitudinal arms 45 pivoted at their rear ends, as at 46, to brackets 47 on the related front beams 1.

A chain 48 leads from the top center of the metering gate 44 rearwardly to the skeleton frame 28, where such chain passes through an elbow-shaped guide tube 49 having a notch 50 in its laterally outermost end. By pulling on the free end of the chain 48 and engaging it in the notch 50 at a selected point on said chain, the metering gate 44 may be set at a desired position of vertical adjustment. The function of such metering gate 44 is of course to permit only a desired quantity of the produce from the pile to be fed by the oscillating pick-up plate 36 to the conveyor.

On opposite sides of the forward section 13 of the endless conveyor belt 12, the machine includes shrouds 51 which embrace the front beams 1, projecting a distance thereabove to form produce retention sides along the edges of said belt. In addition the endless chain and sprocket units 35 and 43 are covered by a protective shroud 52.

The wheels 8 are reversibly driven at very low speed, and in a direction to advance the machine into a pile of produce, or to retract said machine, by means of the following arrangement:

A reduction gear box 53 is mounted on a platform 54 secured in connection with, and overhanging, the axle housing 10 centrally of its ends; such reduction gear box 53 being driven by an electric motor 55 in unitary relation therewith. The electric motor 55 is of reversible type; the reversing switch, which is mounted on the post structure 33, being indicated at 56.

The motor driven reduction gear box 53 drives an endless chain and sprocket unit 57, which in turn actuates a gear box 58 associated with the axle housing 10 and which drives the axle 9.

With the forward advance of the machine into the pile of produce, a quantity thereof is continuously fed upwardly and rearwardly by the forward section 13 of the endless conveyor belt 12, and at the upper end of said section the produce passes between a pair of deflector plates 59 which upstand from the front ends of the rear beams 3, and which deflector plates are canted slightly laterally inwardly in part to assure that the produce as it transfers from the forward section 13 to the rearward section 14 is fed onto the latter without too closely approaching the longitudinal edges thereof.

As the produce continues rearwardly on the rearward section 14 of the endless conveyor belt 12, it is engaged by a sweep or diverting unit, indicated generally at 60, and which unit is operative to cause the produce to deliver laterally off one side of said rearward section 14, and to gravitationally discharge into the hopper 61 of a portable, carry-off conveyor, indicated generally at 62. The carry-off conveyor 62 is disposed in a laterally extending position alongside the rearward section 14 of the endless conveyor belt 12.

More specifically, the produce sweep or diverting unit 60 is arranged so that it remains in a relatively fixed position with respect to the carry-off conveyor 62, while the machine otherwise advances into the pile of produce; this is to the end that said unit 60 continues to deliver the produce to the hopper 61 while the machine advances a considerable distance, eliminating the need of more often moving the portable carry-off conveyor 62.

In order to accomplish the foregoing, the sweep or diverting unit 60 is constructed as follows:

A plurality of longitudinally spaced posts 63 are removably secured in sockets 64 on one of the rear beams 3; such posts upstanding and supporting—at their upper ends— a longitudinal channeled guide 65 in which a roller unit 66 runs is retained, guided relation.

A horizontal boom 67 extends transversely across the rearward section 14, and thence projects laterally outward some distance in a direction opposite the guide 65. At its inner end the boom 67 is fixed in connection with the roller unit 66 by securing and bracing bars 68.

The outer end portion of the boom 67 overhangs the carry-off conveyor 62 centrally of its sides, and is maintained in such position by engagement between spaced upstanding fingers 69 on—and rigid with—an adjustable width, inverted U-frame 70 secured to the sides of said conveyor 62 by clamps 71.

A diagonal sweep or diverting plate 72 is disposed above the rearward section 14 of the endless conveyor belt 12, with the lower edge of said plate disposed very close to the belt; such plate 72 being angled in a direction to cause the produce to be swept from the belt laterally off thereof and into the hopper 61. The adjacent rear beam 3 is fitted, on the outside, with a longitudinal chute plate 73 to aid in the feeding of the produce into the hopper 61 as it is swept off the belt by the diverting plate 72.

The chute plate 73 is supported by pins 74 secured in sockets 75 on said adjacent rear beam 3. The sockets 64 and 75 have the same longitudinal spacing on their respective beams; this to the end that the posts 63 and the pin 74 may be engaged in the sockets on either side of the machine; this being for the purpose of reversal of the sweep or diverting unit 60, as will hereinafter appear.

The sweep or diverting plate 72 diagonals directly below the inner portion of the boom 67, and such plate is vertically hinged intermediate its ends, as at 76, to a vertically disposed transverse mounting plate 77 secured at its upper edge, as by welding, to the boom 67. At its inner vertical edge the mounting plate 77 is secured to a roller unit 78 which runs on a longitudinally extending, vertically disposed sideboard 79 fixed to the posts 63.

With the roller unit 66 relatively movable in the guide 65, and with the roller unit 78 relatively movable along the sideboard 79, the sweep or diverting unit 60 may remain in a fixed position as the machine advances, and which fixed position is maintained by reason of the boom 67 being engaged between the rigid fingers 69 of the inverted U-frame 70.

In order to normally maintain the sweep or diverting plate 72 in its angled or diagonaled position, a stay arm 80 extends between the boom 67 and said plate adjacent its rearmost end; said stay arm removably engaging—at the ends—in sockets 81 and 82 formed in said boom and plate, respectively.

The sideboard 79 not only provides a trackway for the roller unit 78, but also serves to prevent escape of the produce from the adjacent side of the rearward section 14 of the endless conveyor belt 12.

Produce is prevented from escaping from the opposite side of said rearward section 14, until the produce reaches a point adjacent the sweep plate 72, by means of a pair of longitudinal, vertically spaced retention rods 83 disposed in a plane slightly above said opposite side of such rearward section 14.

The rods 83 are quite long, and at their forward end portions they normally extend in slidable relation in corresponding longitudinal guide sleeves 84 formed as part of the skeleton frame 28. At their rear ends, which are disposed adjacent but short of the sweep or diverting plate 72, the produce retention rods 83 are rigidly secured to an arch rod 85, and which arch rod is removably connected at its rear end to the boom 67 by engagement in a socket 86.

The arch rod 85 defines an opening through which the produce may be swept from the conveyor by the plate 72, and also serves as a means to cause the retention rods 83 to remain in a fixed position relative to said plate 72 as the machine advances; i. e., to move relatively rearwardly, sliding from the guide sleeves 84, whereby to form a progressively longer produce retention means along the adjacent side of the rearward section 14 of the conveyor belt 12.

When the above described machine is in use it functions smoothly, effectively, and positively to pick up and elevate a continuous stream of produce—in controlled quantity— from a pile; the produce then being discharged by the sweep or diverting unit 60 into the hopper 61 of the carry-off conveyor 62 disposed alongside the rear portion of the machine, as hereinbefore described.

By reason of the fact that the sweep or diverting unit 60 remains in a fixed alined position relative to the conveyor 62, the machine can advance a substantial distance into the pile before it becomes necessary to re-position the portable carry-off conveyor 62.

In the present embodiment the produce sweep or diverting unit 60 is shown as set to discharge laterally to the right, but discharge—when desired—from the opposite side can be accomplished by merely reversing the elements of said unit. This is done by placing the posts 63 in the sockets 75, the chute plate pins 74 in the sockets 64, and by reversing the angle of the plate 62 after removal of the stay arm 80. In the reverse position of the plate 72 the stay arm 80 is engaged at its ends in the socket 81 and another socket 87 on the plate 72 at the end opposite the socket 82.

Additionally, when the parts of the sweep or diverting unit 60 are reversed, as above described, retention rods 83 then slidably engage in other guide sleeves 88 mounted in connection with skeleton frame 28 on the side of the machine opposite the guide sleeves 84.

It is thus possible to set the machine, readily and conveniently, for right or left hand discharge of the produce from the rearward section 14 of the endless conveyor belt 12.

While the oscillating pick-up plate 36 is here shown as actuated from the separately driven cross shaft 42, such plate can, if desired, be similarly operated from the shaft of the idler roller 15.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A machine adapted to pick up, elevate, and discharge bulk produce from a pile, comprising a longitudinal frame supported for movement along a floor, means to advance the frame into a pile of bulk produce on the floor, an endless driven conveyor mounted lengthwise on the frame, the conveyor including a forward section and a rearward section, the forward section extending at an upward and rearward incline from adjacent the floor, means to feed produce from the pile onto the front end portion of said forward section upon such advance of the frame, an adjustable metering gate associated with said forward section and adapted to control the quantity of produce so fed, and means associated with the rearward section adapted to discharge produce therefrom at a selected point; said metering gate including a plate disposed in upstanding forwardly facing relation above the front end portion of said forward section, transversely spaced longitudinal arms fixed to the plate and extending rearwardly, means transversely pivoting the arms at their rear ends to the frame, and means suspending the plate and arm assembly from the frame in normally fixed but vertically adjustable relation.

2. A machine adapted to pick up, elevate, and discharge bulk produce from a pile, comprising a longitudinal frame supported for movement along a floor, means to advance the frame into a pile of bulk produce on the floor, an endless driven conveyor mounted lengthwise on the frame, the conveyor including a forward section and a rearward section, the forward section extending at an upward and rearward incline from adjacent the floor, means to feed produce from the pile onto the front end portion of said forward section upon such advance of the frame, the rearward section being substantially horizontal, a diagonal sweep disposed above the rearward section in cooperating relation and operative to discharge produce laterally therefrom, a longitudinal guide mounted in connection with the frame adjacent and corresponding to said rearward section, means movable along the guide and supporting the sweep for relative movement lengthwise of said rearward section, an element projecting from the sweep for holding the latter stationary as the frame advances; the machine being adapted to be disposed with produce receiving apparatus in a stationary position alongside said rearward section, and means between said apparatus and element arranged to maintain the latter in holding relation to the sweep.

3. A machine, as in claim 2, in which said holding element is a boom secured to the sweep and projecting laterally beyond one side of said rearward section; there being means on said apparatus cooperating with the boom to prevent its movement in the direction of advance of the frame.

4. A machine adapted to pick up, elevate, and discharge bulk produce from a pile, comprising a longitudinal frame supported for movement along a floor, means to advance the frame into a pile of bulk produce on the floor, an endless driven conveyor mounted lengthwise on the frame, the conveyor including a forward section and a rearward section, the forward section extending at an upward and rearward incline from adjacent the floor, means to feed produce from the pile onto the front end portion of said forward section upon such advance of the frame, the rearward section being substantially horizontal, a diagonal sweep disposed above the rearward section in cooperating relation and operative to discharge produce laterally from one side of said section, a produce retention sideboard mounted on the frame and extending along the opposite side of said rearward section, means mounting the sweep in connection with the frame for relative movement lengthwise of said rearward section, means adapted to hold the sweep stationary as the frame advances, a produce retention member extending along said one side of the rearward section, the rear end portion of said member being arched and connected with the sweep so as to define an unobstructed produce discharge opening immediately ahead of the sweep, said member extending ahead of the front end of the rearward section, and means supporting the member from the frame for relative longitudinal sliding movement.

5. A machine adapted to pick up, elevate, and discharge bulk produce from a pile, comprising a longitudinal frame supported for movement along a floor, means to advance the frame into a pile of bulk produce on the floor, an endless driven conveyor mounted lengthwise on the frame, the conveyor including a forward section and a rearward section, the forward section extending at an upward and rearward incline from adjacent the floor, means to feed produce from the pile onto the front end portion of said forward section upon such advance of the frame, the rearward section being substantially horizontal, a diagonal sweep disposed above the rearward section in cooperating relation and operative to discharge produce laterally therefrom, a longitudinal guide member extending along and above the side of said rearward section opposite that from which the produce discharges, means mounting the guide in connection with the frame, said means including longitudinally spaced posts, a longitudinal, produce retention sideboard secured to said posts, a boom extending transversely of the conveyor above the sweep, means guiding the boom at its inner end on said guide member, means securing the sweep to the boom, and an element mounted in connection with the boom engaging and adapted to run along the face of said sideboard to maintain the boom and sweep against sagging; the boom projecting to a free end termination laterally out from the produce discharge side of said rearward section, and boom holding means adapted to be mounted on stationary apparatus disposed alongside side rearward section in produce receiving relation.

6. In a mobile, power advanced machine adapted to work into a pile of produce on a floor to pick up, then elevate, and finally discharge said produce into stationary receiving apparatus spaced from the pile; the machine including an elongated frame, an endless driven conveyor on the frame lengthwise thereof, said conveyor having a forward section inclining upwardly and rearwardly from closely adjacent the floor, and a substantially horizontal rearward section; frame supported produce pick-up means at the front end of the forward section operative to deliver onto the latter, a diagonal sweep over and cooperating with the rearward section adapted to discharge produce laterally from one side of said rearward section, means mounting the sweep on the frame for relative longitudinal movement, there being a stationary produce receiving apparatus disposed at said one side of the rearward section to receive produce discharged therefrom by the sweep, and means between the sweep and apparatus operative to hold said sweep in fixed position relative to said apparatus as said rearward section moves forward with advance of the machine.

7. A machine, as in claim 6, in which said last named means includes a holding element projecting from the sweep in the direction of said apparatus, and a stop mounted on said apparatus; the holding element abutting said stop.

8. In a machine to pick up and discharge bulk produce from a pile, a longitudinal frame, an endless driven conveyor mounted lengthwise on the frame, means to feed produce from a pile on a floor onto the conveyor at its forward end for advance thereby toward the rear end of the conveyor, a diagonal sweep plate overlying the conveyor adjacent its rear end and operative to discharge produce laterally from one side of the conveyor, supporting means for the sweep plate including a produce-retaining side board extending along the other side of the conveyor and rigid posts depending from the board in spaced relation along the conveyor, and sockets fixed on the frame laterally out from both sides of the conveyor to removably receive the posts; the longitudinal spacing of the posts on opposite sides of the conveyor being the same whereby the swing plate supporting means may be reversibly mounted in connection with the conveyor, and means mounting the swing plate on the supporting means for reversal of the diagonal setting thereof when the supporting means is reversed.

9. A machine, as in claim 8, with a chute plate extending along and at a downward angle from the side of the conveyor opposite the side board, and posts depending from the chute and of a size and spacing to removably fit in the corresponding sockets.

10. A machine adapted to pick up, elevate, and discharge bulk produce from a pile, comprising a longitudinal frame supported for movement along a floor, means to advance the frame into a pile of bulk produce on the floor, an endless driven conveyor mounted lengthwise on the frame, the conveyor including a forward section and a rearward section, the forward section extending at an upward and rearward incline from adjacent the floor, means to feed produce from the pile onto the front end portion of said forward section upon such advance of the frame, the rearward section being substantially horizontal, a diagonal sweep disposed above the rearward section in cooperating relation and operative to discharge produce laterally therefrom, means mounting the sweep on the frame for movement lengthwise of said rearward section, and a member included with said mounting means adapted for engagement with a stationary object separate from the machine whereby the sweep will be held stationary as the machine advances.

11. A machine adapted to pick up, elevate, and discharge bulk produce from a pile, comprising a longitudinal frame supported for movement along a floor, means to advance the frame into a pile of bulk produce on the floor, an endless driven conveyor mounted lengthwise on the frame, the conveyor including a forward section and a rearward section, the forward section extending at an upward and rearward incline from adjacent the floor, means to feed produce from the pile onto the front end portion of said forward section upon such advance of the frame, the rearward section being substantially horizontal, a diagonal sweep disposed above the rearward section in cooperating relation and operative to discharge produce laterally from one side thereof, produce retaining rods extending along said side of the rear section and terminating at their rear end short of the sweep to leave a lateral discharge passage between the sweep and rods, means mounting the sweep and rods as a unit on the machine for movement lengthwise of said rear conveyor section, and means to engage and hold the mounting means in a stationary position relative to the machine as the latter advances.

References Cited in the file of this patent

UNITED STATES PATENTS

| | | |
|---|---|---|
| 754,546 | Deady, Jr. | Mar. 15, 1904 |
| 757,284 | Doss | Apr. 12, 1904 |
| 1,000,337 | Leyner et al. | Aug. 8, 1911 |
| 1,213,077 | Collier | Jan. 16, 1917 |
| 2,288,159 | Ernst | June 30, 1942 |
| 2,519,138 | Katz | Aug. 15, 1950 |
| 2,721,645 | Eberle | Oct. 25, 1955 |

FOREIGN PATENTS

| | | |
|---|---|---|
| 826,434 | Great Britain | Jan. 3, 1952 |